United States Patent [19]

Kiyohara et al.

[11] Patent Number: 4,849,783
[45] Date of Patent: Jul. 18, 1989

[54] INFORMATION SETTING APPARATUS FOR A CAMERA

[75] Inventors: Syuichi Kiyohara; Nobuyuki Suzuki; Masayoshi Kiuchi, all of Kanagawa, Japan

[73] Assignee: Canon Kabushiki Kaisha, Tokyo, Japan

[21] Appl. No.: 198,705

[22] Filed: May 17, 1988

Related U.S. Application Data

[63] Continuation of Ser. No. 875,502, Jun. 18, 1986, which is a continuation of Ser. No. 700,679, Feb. 12, 1985, abandoned.

[30] Foreign Application Priority Data

Feb. 13, 1984 [JP] Japan .................................... 59-2482

[51] Int. Cl.$^4$ .............................................. G03B 7/08
[52] U.S. Cl. .................................... 354/442; 354/475; 354/289.1
[58] Field of Search .............................. 354/441–443, 354/475, 484, 486, 289.1, 289.12

[56] References Cited

U.S. PATENT DOCUMENTS

| | | | |
|---|---|---|---|
| 4,191,458 | 3/1980 | Kawamura et al. | 354/475 |
| 4,483,601 | 11/1984 | Sekida et al. | 354/289.1 |
| 4,497,564 | 2/1985 | Meguro et al. | 354/442 |
| 4,525,054 | 6/1985 | Someya et al. | 354/289.1 |
| 4,529,291 | 7/1985 | Mizogui | 354/289.1 |
| 4,536,074 | 8/1985 | Someya et al. | 354/442 |

*Primary Examiner*—Russell E. Adams
*Attorney, Agent, or Firm*—Toren, McGeady & Associates

[57] ABSTRACT

An information setting apparatus for a camera in which a plurality of photographing modes can be selected by selecting means, and when the mode has been selected and changed over by the selecting means the photographing information value is automatically changed into a specific value such as a normal value or an intermediary value in the selected mode so as to increase the operability.

4 Claims, 2 Drawing Sheets

FIG.2

| MODE | M0 | M1 | M2 |
|---|---|---|---|
| PROGRAM | 1 | 0 | 0 |
| Av PRIORITY | 0 | 1 | 0 |
| Tv PRIORITY | 0 | 0 | 1 |

FIG.3

| PROGRAM | Av PRIORITY | Tv PRIORITY | Q0 | Q1 | Q2 | Q3 |
|---|---|---|---|---|---|---|
|  |  |  | 0 | 1 | 1 | 0 |
|  |  |  | 1 | 1 | 1 | 0 |
|  |  | 2" | 0 | 0 | 0 | 1 |
|  |  | 1" | 1 | 0 | 0 | 1 |
|  |  | 2 | 0 | 1 | 0 | 1 |
|  | 1.2 | 4 | 1 | 1 | 0 | 1 |
|  | 1.4 | 8 | 0 | 0 | 1 | 1 |
|  | 2.0 | 16 | 1 | 0 | 1 | 1 |
|  | 2.8 | 30 | 0 | 1 | 1 | 1 |
| TELE | 4 | 60 | 1 | 1 | 1 | 1 |
| NORMAL | 5.6 | 125 | 0 | 0 | 0 | 0 |
| WIDE | 8 | 250 | 1 | 0 | 0 | 0 |
|  | 11 | 500 | 0 | 1 | 0 | 0 |
|  | 16 | 1000 | 1 | 1 | 0 | 0 |
|  | 22 |  | 0 | 0 | 1 | 0 |
|  | 32 |  | 1 | 0 | 1 | 0 |

INFORMATION SETTING APPARATUS FOR A CAMERA

BACKGROUND OF THE INVENTION

This is a continuation of application Ser. No. 875,502, filed June 18, 1986, which is a continuation of Ser. No. 700,679, filed Dec. 12, 1985, now abandoned.

1. Field of the Invention

The present invention relates to an information setting apparatus for a camera.

2. Description of the Prior Art

Quite recently, in order to set the photographing information a device has been proposed, in which a switch is operatively associated with the depression of a button for rotating a dial so as to be opened and closed in such a manner that pulses are produced with the closing and the opening operation of the switch and counted by a counter so as to set the information. However, the camera having such an information setting apparatus and been capable of taking multi-mode photography (for example, the shutter or the aperture priority) has the following shortcomings. Suppose that after a shutter time 1/1000 sec. has been set in the shutter priority mode, the mode is changed over into the aperture priority mode, and the digital value representing the above 1/1000 sec. (the value set in the counter by the above switch) corresponds to a digital value representing a fully open aperture value (for example, F 1.2) as the aperture value. Then, F 1.2 is set as the set information by the above mode change over. Thus, in case where it is desired to set F 5.6 in the aperture priority mode, it is necessary to change the set value, which is inconvenient for the operation.

On the other hand, when the photography in the aperture priority mode, F 5.6 is mostly used as the normal aperture value so that in the aperture priority mode it is desired that the above normal value is automatically set when the mode is changed over, regardless of the shutter time set in the shutter time priority mode.

Further, U.S. Pat. No. 4,191,458 discloses an apparatus in which the set information is automatically set, for example, 1/125 sec. in the shutter priority mode and F 8 or the like is set in the aperture priority mode when the power source is switched on. However, even in the case of this apparatus only the normal value is set when the power source is switched on, whereby when the photographing mode is changed over after the power source has been switched on, the value is not changed into the normal value automatically in the selected photographing mode so that the above problem cannot be solved.

SUMMARY OF THE INVENTION

It is, accordingly, an object of the present invention to provide an apparatus which sets the photographing information automatically at the normal value in the selected photographing mode in operative association with the change over of the photographing mode.

It is another object of the present invention to provide an apparatus which automatically selects a specific photographing mode in a camera having a plurality of photographing modes when the power source is switched on.

Further objects and features of the present invention will become apparent from the description to be made below with reference to the accompanying drawings of the embodiment of the present invention:

BRIEF DESCRIPTION OF THE DRAWINGS

FIGS. 2 and 3 are diagrams explaining the operation of the embodiment in FIG. 1.

DETAILED DESCRIPTION OF THE PREFERRED EMBODIMENT

Figure 1:
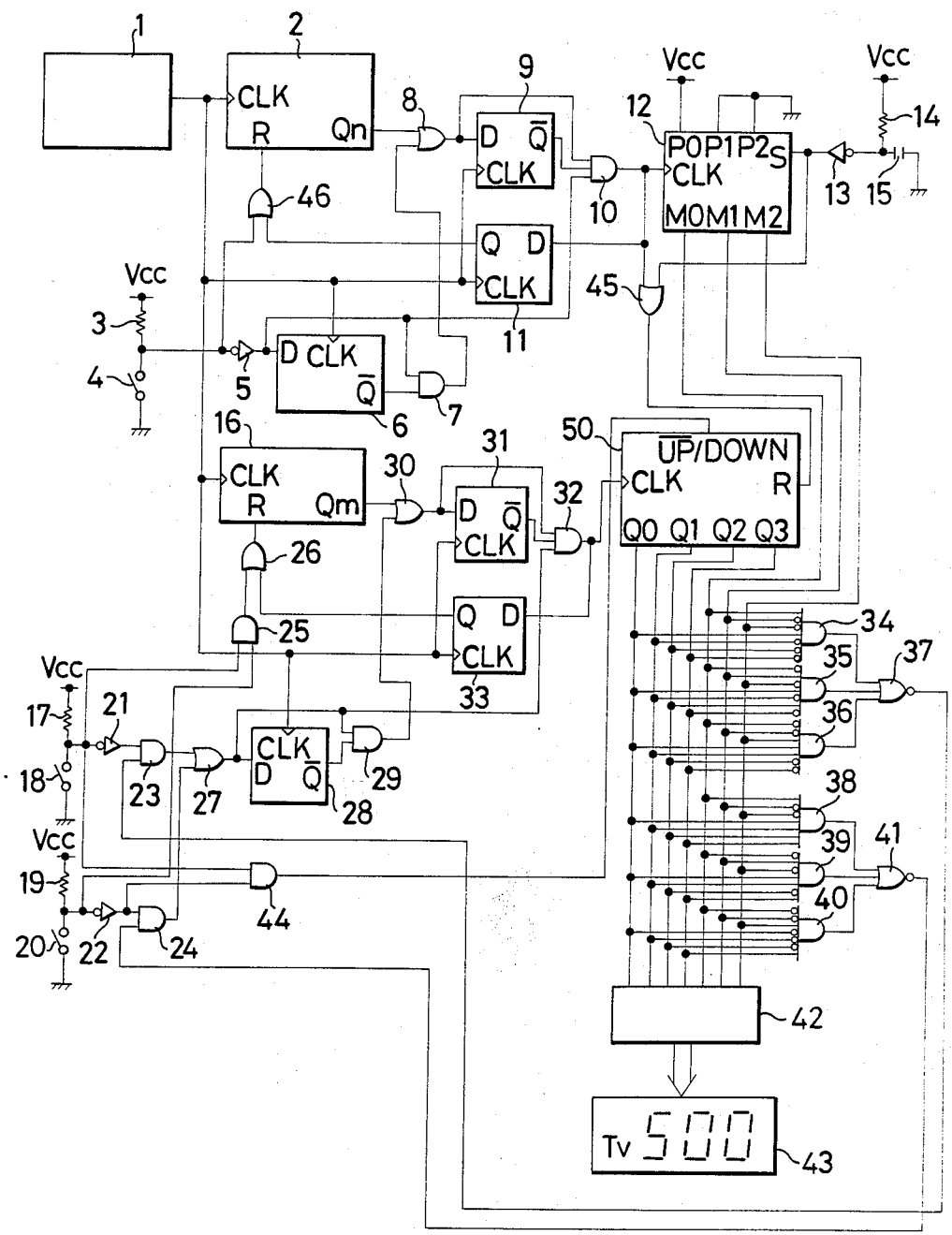
FIG. 1 shows a circuit diagram of an embodiment of the information setting apparatus of the present invention.

FIG. 1 shows the circuit diagram of an embodiment of the information setting apparatus of the present invention. In the drawing, 1 is a clock pulse producing circuit for producing the reference clock pulses. 2 is a counter to whose CLK terminal (clock terminal) the pulses from the pulse producing circuit 1 are delivered and from whose terminal Qn the frequency divided signal is delivered by counting a predetermined number of pulses. R is an reset terminal. When the reset terminal R is applied with a high level signal (hereinafter called H0, the counter 2 is brought into a reset state, and the output terminal Qn delivers a low level signal (hereinafter called L). 3 is a resistor provided for the pull up of a switch 4 to be explained later and the one end of the resistor 3 is connected to the power source line. 4 is the switch for setting the mode. 5 is an inverter, 46 is an OR gate, 6 is a D input Flip-Flop (hereinafter called DFF) and 7 is an AND gate, whereby the DFF 6 and the AND gate 7 constitute the one shot multi-vibrator. 8 and 45 are OR gates, 9 and 11 are DFFs and 10 is an AND gate, whereby the DFF 9 and the AND gate 10 constitute a one shot multi-vibrator. 12 is a presettable ring counter, whereby when a pulse is applied to an S terminal (set terminal) the state of the P0, P1, and P2 input terminals is preset with the rising up of the pulse and the state is delivered from output terminals M0, M1, and M2. 13 is an inverter and 14 is a resistor, whose one end is connected to the power source line. 15 is a condenser. The inverter 13, the resistor 14 and the condenser 15 constitute a power on reset circuit, whereby when a predetermined voltage takes place in the power source line the inverter 13 delivers H during a certain time determined by the resistor 14 and the condenser 15 so as to preset the ring counter 12.

The ring counter 12 is the counter for setting the photographing mode of the camera, and the relation between the count value of the counter 12 and the set mode is as shown in FIG. 2. In FIGS. 2 and 3, H is represented as 1, and L as 0. 16 is a counter to whose CLK terminal the pulses are delivered from the pulse producing circuit 1 and the frequency divided signal is delivered from the terminal Qm by counting a certain number of pulses. When the R terminal for resetting is applied with H, the counter 14 assumes the reset state so as to deliver L from the terminal Qm. 17 and 19 are resistors provided for the pull up of the switches 18 and 20 to be explained later and the one end of each of resistors 17 and 19 is connected to the power source line. 18 and 20 are the switches respectively for the up count and the down count of the set information. 21 and 22 are inverters. 23, 24, 25 and 44 are AND gates. 26 and 27 are OR gates. 28 is a DFF and 29 is an AND gate, whereby the DFF 28 and the AND gate 29 constitute the one shot multi-vibrator. 30 is an OR gate. 31 and 33 are DFFs and 32 is an AND gate, whereby the DFF 31 and the AND gate 32 constitute a one shot multi-vibrator. 50 is an up down counter, whereby when H is applied to the UP/DOWN terminal the down count operation is carried out, while when L is applied the up count is operated and the count outputs are delivered from the output terminals Q0–Q3. When H is applied to the R terminal, the count operation stops and all the outputs Q0–Q3 become L.

The up down counter 50 serves to set the program selecting information, the aperture value information and the shutter time value information, and the relation between the count value of the counter and the set information is as shown in FIG. 3. In FIG. 3, H is represented as 1, and L as 0.

34, 35, 36, 38, 39 and 40 are 7 input AND gates. 37 and 41 are 3 input NOR gates. The mark "o" in the drawing represents the inverter. 42 is a decoder driver which converts the outputs M0–M2 of the counter 12 and the outputs Q0–Q3 of the counter 50 into the codes suited for display and drives a display 43.

The above display 43 is composed, for example, of liquid crystal, LED and so on.

Further, the outputs of the counters 12 and 50 are connected to a calculating circuit (not shown) in such a manner that the photographing mode set information set in the counter 12 and the information set in the counter 50 such as the program selecting information, the aperture value information, the shutter time value information are calculated in the calculating circuit and used for the control of the camera.

Below, the operation of the construction in FIG. 1 will be explained. When at first a power source (not shown) is closed, the power source voltage Vcc is supplied to each of the predetermined parts. In case the switch 4 is opened, the output of the OR gate 46 becomes H and applied to the R terminal of the counter 2 so that the counter 2 stops the count operation. Further when both of the switches 18 and 20 are opened, the both inputs to the AND gate 25 are H so that the output is also H. Thus, also the output of the OR gate 26 becomes H, which is applied to the R terminal of the counter 16 so that the counter 16 stops the count operation. At this time, the power on reset circuit including the inverter 13, the resistor 14 and the condenser 15 begins to operate with the switching on of the power source and delivers H when the power source is switched on so as to set the counter 12. Further, also the output of the OR gate 45 becomes H and resets the counter 50. Thus, the output of the counter 12 is (M0, M1, M2)=(1, 0, 0) and that of the counter 50 is (Q0, Q1, Q2, Q3)=(0, 0, 0, 0) immediately after the power source is switched on. These outputs are converted by the decoder driver 42 into the codes to be displayed in the display 45 as "PROGRAM NORMAL". Namely, when the power source is switched on, the mode is automatically set in the program mode which is the complete automatic mode out of the AV priority mode, TV priority mode and the grogram mode, while the normal program information (program constant ½) is set. Thus, even if the release button is depressed immediately after the power source is switched on, the proper exposure can be obtained without paying attention to the set value.

When then in order to set the photographing mode the button (not shown) is depressed so as to close the switch 4 the output of the inverter 5 becomes H and applied to the D terminal of the DFF 6, so that the one shot multi-vibrator including the DFF 6 and the AND gate 7 delivers the predetermined one shot pulse from the output of the AND gate 7. The one shot pulse is applied to the D terminal of the DFF 9 via the OR gate 8, whereby the one shot multi-vibrator including the DFF 9 and the AND gate 10 is triggered by the pulse so as to deliver the predetermined one shot pulse from the output of the gate 10.

The one shot pulse is applied to the CLK terminal of the counter 12, which carries out the 1 count. When in this way, the counter 12 carries out the 1 count, the output of the counter 12 becomes (M0, M1, M2)=(0, 1, 0), whereby the display in the display 43 is changed over from "PROGRAM NORMAL" to "Av 5.6" so as to set the Av value of 5.6 in the Av priority mode. Every time the switch 4 is closed after the counter 12 carries out the 1 count, the corresponding mode and the common set value of the photographing information corresponding to the mode is displayed.

When the switch 4 is kept in the closed state even after the counter 12 carried out 1 count and "Av 5.6" is displayed by closing the switch 4, the counter 2 remains cleared out of the reset state because the both inputs to the OR gate 46 are in L state. Thus, the counter 2 starts to count the clock pulses of the clock pulse producing circuit 1. After the lapse of a predetermined time (for example, 500 m sec.) from the start of the counting, the counter 2 delivers H from the output terminal Qn, and because the output of the AND gate 7 is L, the output of the OR gate 8 is H in the same way as at the output terminal Qn of the counter 2. When the output of the OR gate 8 becomes H, the one shot multi-vibrator including of the DFF 9 and the AND gate 10 is triggered to deliver a predetermined one shot pulse from the output of the AND gate 10.

In the same way as in the above-mentioned case, the one shot pulse is applied to the CLK terminal of the counter 12, which carries out 1 count. When in this way the counter 12 further carries out 1 count, the output of the counter 12 becomes (M0, M1, M2)=(0, 0, 1) and the display of the display 43 is changed over from "Av 5.6" to "Av 125" so as to set the Tv value 125 in the Tv priority mode. Further, because the DFF 11 delivers the reset pulse by the one shot pulse from the AND gate 10, the counter 2 is reset and starts the next counting. Thus, as long as the switch 4 is kept in the closed state after that, at every lapse of the predetermined time, the display is changed over like "Tv 125"→"Program Normal"→"Av 5.6"→"Tv 125"→"Program Normal"→37 Av 5.6"→. . .

Below, the case when the up button (not shown) is depressed in order to set the photographing information in the Tv priority mode for example after the Tv priority mode has been selected will be explained. When the up button is depressed once the switch 18 is closed for a moment. Thus, the inverter 21 delivers H for a moment, which is input in the one terminal of the AND gate 23. Further, the other input terminal of the AND gate 23 is connected to the output terminal of the 3 input NOR gate 37 to whose each input terminal the 7 input AND gates 34, 35 and 36 are respectively connected, whereby because the output of the counter 12 is (M0, M1, M2)=(0, 0, 1), while the output of the counter 50 is (Q0, Q1, Q2, Q3)=(0, 0, 0, 0) all the output of the AND gates 34, 35 and 36 are L and therefore the output of the NOR gate 37 is H. Thus, the output of the AND gate 23 is H as long as the above switch 18 is closed. Because this signal is applied to the D terminal of the DFF 28 via the OR gate 27, the one shot multivibrator including the DFF 28 and the AND gate delivers a predetermined one shot pulse from the output of the AND gate 29. This one shot pulse is applied to the D terminal of the DFF 31 via the OR gate 30 and the one shot multivibrator including the DFF 31 and the AND gate 32 is triggered by the pulse so as to deliver a predetermined pulse from the output of the AND gate 32.

The above one shot pulse is applied to the CLK terminal of the counter 50. Because at this time the switch 18 is closed, while the switch 20 is opened, the output of the AND gate 44 is L, which is applied to the UP/- DOWN terminal of the counter 50 so that the counter 50 is in the up count mode and carries out the 1 up count by the above one shot pulse. Thus, the output of the counter 50 becomes $(Q0, Q1, Q2, Q3)=(1, 0, 0, 0)$ so that the display in the display is changed over from "Tv 125" "Tv 250". After that at every depression of the up button the counter carries out the 1 up count and the corresponding shutter time is displayed in the display 43.

When the shutter time value displayed in the display 43 becomes "1000" during the process of the repeated depression of the switch 18 as mentioned above, the output of the counter 50 becomes $(Q0, Q1, Q2, Q3)=(1, 1, 0, 0)$, when the output of the AND gate 36 becomes H and thus the output of the NOR gate becomes L so as to make the output of the AND gate 23 L. Thus, even if the switch 18 is depressed after the shutter time value has been set to the shortest limit value "1000", no pulse is delivered to the counter 50 and therefore the shutter time value is kept at the limit value.

Further, the down button (not shown) is depressed instead of the up button, the switch 20 is closed at every depression of the down button, the above-mentioned one shot multi-vibrators (28, 29, 31, 32) deliver a pulse and the counter 50 renovates its content by 1 step in the same way as in case the switch 18 is depressed, whereby when the switch 20 is closed, the AND gate 44 delivers H so that the above 1 step count operation by the counter 50 is the down count operation.

Thus, the switch 20 is closed instead of the switch 18, the shutter time value displayed in the display 43 changes from the smaller value to the larger value by every closing of the switch 20. Further, when the value displayed in the display 43 is the largest limit value "2″" the output of the counter 50 is $(Q0, Q1, Q2, Q3)=(0, 0, 0, 1)$ so that the AND gate 40 delivers H and thus the NOR gate 41 delivers L so as to make the output of the AND gate 24 L. Thus, even when the down button is further depressed after the shutter time has been set at the largest time the above one shot multi-vibrator does not operate and the count value of the counter 50 remains at the largest value.

Below, the case where the up button continues to be depressed will be explained. When the switch 18 is kept in the closed state even after the switch 18 is closed by the depression of the up button and the counter 50 carries out 1 count, because the both inputs of the OR gate 26 are L, the counter 16 starts to count the clocks of the clock pulse producing circuit 1. The counter 16 delivers H from the output terminal Qm of the counter 16 after the lapse of the predetermined time (for example, 500 msec.) from the start of the counting, when the output of the AND gate 29 is L so that the output of the OR gate 30 is also H in the same way at the output terminal Qm of the counter 16. When the output of the OR gate 30 becomes H, the one shot multivibrator including the DFF 31 and the AND gate 32 is triggered so as to deliver a predetermined one shot pulse from the output of the AND gate 32. This one shot pulse is applied to the CLK terminal of the counter 50, which carries out another 1 count. Further, this one shot pulse is transmitted to the counter 16 as the reset pulse by the DFF 33. Thus, the counter 16 is reset at every 1 count of the counter 50, from which state the count operation is started so that the counter 50 carries out 1 count at a predetermined cycle.

In this way, the up count is continuously carried out at every lapse of a predetermined time until the output of the counter 50 becomes $(Q0, Q1, Q2, Q3)=(1, 1, 0, 0)$.

In the same way the down count is continuously carried out at every lapse of a predetermined time until the output of the counter 50 becomes $(Q0, Q1, Q2, Q3)=(0, 0, 0, 1)$.

As mentioned above, when the button for setting the mode is depressed after the desired shutter time has been set by depressing the up or the down button in the Tv priority mode, the switch 4 is closed, the AND gate 10 delivers one shot pulse as mentioned above and the counter 50 carries out 1 count so as to change over from the Tv priority to the program. Further, because the pulse from this gate 10 is input in the reset terminal of the counter 50 via the gate 45, the content of the counter 50 is compulsorily reset regardless of the value previously set simultaneously with the change of the mode so that the normal value for the changed mode is set in the counter 50. Because in this case the change takes place from the Tv priority, "Program Normal" is displayed in the display 43 by the operation of the switch 4 from the Tv priority mode.

Thus, according to the present invention, with the change of the mode, regardless of the value previously set in the counter 50, the display is always changed over into the normal value in the then mode, which improves the operability of the information setting apparatus for the camera capable of selecting several modes.

Hereby, although in the case of the present embodiment, the button to be depressed is operatively associated with the switches 4, 18 and 20, it is possible to operatively associate these switches with a dial instead of the button so as to close the switches by rotating the dial.

Further, for the mode setting, it is possible to provide a mode selector member for selecting the mode by the position and a digital switch or a switch for forming a digital value representing the mode corresponding to the set position of the member so as to select the mode and to input the information of the above switch directly to a part of the input of the decoder 42 instead of the counter 12. In this case it is sufficient to provide a switch to be closed for a moment in operative association with the change of the above set position so as to reset the counter 50 by the change operation of the position. Further, Although in the case of the present embodiment, 1/125 sec. is taken for the Tv priority and F 5.7 for the Av priority as the normal value, it goes without saying that a predetermined value in the range of 1/60–1/250 sec. can be taken for the Tv priority and that in the range of F 4–F 8 for the Av priority. Further, although in the case of the present embodiment, the normal value for the mode is set with the change of the mode it is possible to set the intermediary value of settable shutter time or aperture value for the Tv priority or the Av priority. In this case, even when the value to be reset is a limit value, the resetting operation can be improved when the resetting to the normal value is necessary because the resetting operation to the limit value can be carried out in a short time, while the intermediary value is normally close to the normal value. Further, although in the case of the present embodiment the counter 50 is reset so as to reset the normal value, it is possible to provide a presettable counter so as to preset a predetermined digital value by the pulse from the gate 45 instead of resetting the counter 50.

What is claimed is:

1. An information setting apparatus for a camera having a plurality of photographing modes including an aperture priority automatic mode and a shutter speed priority automatic mode, comprising:
    (a) a first operation member for selection of said modes;
    (b) a second operation member provided so as to change a preset value in a selected mode; and
    (c) a circuit coupled to said second operation member so as to provide a signal corresponding to a preset value, said circuit changing the signal in response to the operation of said second operation member, and said circuit changing the signal corresponding to the preset value changed by said second operation member to a specific signal representing a preset value normally used in a selected mode in response to the selection operation by said first operation member.

2. An apparatus according to claim 1, wherein said circuit includes a counter provided so as to change its content in response to operation of the second operation member, said counter providing a signal corresponding to its content as a preset value.

3. An apparatus according to claim 2, wherein the content of said counter is set to a specific value by operation of said first operation member.

4. An apparatus according to claim 1, and further comprising means for forming a signal in response to operation of said first operation member so that said circuit changes the signal to a specific value in response to the signal from said signal forming means.

* * * * *

UNITED STATES PATENT AND TRADEMARK OFFICE
CERTIFICATE OF CORRECTION

PATENT NO. : 4,849,783
DATED : July 18, 1989
INVENTOR(S) : Syuichi Kiyohara et al It is certified that error appears in the above-identified patent and that said Letters Patent is hereby corrected as shown below: Title page:

In the heading of the Patent, it should read:

[30]   Foreign Application Priority Data

Feb. 13, 1984 [JP]  Japan ............ 59-24682

Signed and Sealed this

Nineteenth Day of June, 1990

Attest:

HARRY F. MANBECK, JR.

*Attesting Officer*        *Commissioner of Patents and Trademarks*